United States Patent
Hrdina (10) Patent No.: US 11,213,922 B2
(45) Date of Patent: Jan. 4, 2022

(54) METHOD FOR PRODUCING A PISTON

(71) Applicant: Mahle International GmbH, Stuttgart (DE)

(72) Inventor: Daniel Hrdina, Stuttgart (DE)

(73) Assignee: Mahel International GmbH

(*) Notice: Subject to any disclaimer, the term of this patent is extended or adjusted under 35 U.S.C. 154(b) by 106 days.

(21) Appl. No.: 16/490,519

(22) PCT Filed: Feb. 16, 2018

(86) PCT No.: PCT/EP2018/053941
§ 371 (c)(1),
(2) Date: Aug. 30, 2019

(87) PCT Pub. No.: WO2018/158092
PCT Pub. Date: Sep. 7, 2018

(65) Prior Publication Data
US 2020/0070289 A1    Mar. 5, 2020

(30) Foreign Application Priority Data
Mar. 2, 2017   (DE) .......................... 102017203433.5

(51) Int. Cl.
*B23P 15/10* (2006.01)
*B23K 20/12* (2006.01)
*B23K 101/00* (2006.01)

(52) U.S. Cl.
CPC ............ *B23P 15/10* (2013.01); *B23K 20/129* (2013.01); *B23K 2101/003* (2018.08)

(58) Field of Classification Search
CPC ....... B23P 15/10; B23K 20/129; B23K 20/12; B23K 2101/003; F02F 2003/0061
See application file for complete search history.

(56) References Cited

U.S. PATENT DOCUMENTS 9,670,871 B2    6/2017   Ottliczky et al.
2004/0177505 A1   9/2004   Bing et al.
(Continued)

FOREIGN PATENT DOCUMENTS

DE   102008012049 A1   9/2009
DE   102012216367 A1   3/2013
(Continued)

OTHER PUBLICATIONS

English abstract for DE-102011100521.

*Primary Examiner* — Moshe Wilensky
(74) *Attorney, Agent, or Firm* — Fishman Stewart PLLC (57) ABSTRACT

A method for producing a piston may include providing a blank of a piston base member with an outer peripheral joining face, an inner peripheral joining face which may be expanded in a direction of a base region of a combustion bowl, and a lower cooling channel portion which may extend between the outer and inner peripheral joining faces, wherein at least one of (i) at least one of the outer and inner peripheral joining faces and (ii) the lower cooling channel portion may be not subsequently processed. The method may then include providing a blank of a piston ring element with an outer annular joining face, an inner annular joining face, and an upper cooling channel portion which may extend between the outer and inner annular joining faces, wherein at least one of (i) at least one of the outer and inner annular joining faces and (ii) the upper cooling channel portion may be not subsequently processed. The method may then include joining the blanks via the outer and inner peripheral joining faces and the outer and inner annular joining faces to form a piston blank in such a manner that, at least in the base region of the combustion bowl, a part-region of the expanded inner peripheral joining face of the blank of the piston base member may remain free. The method may further include subsequently at least partially (Continued)

processing the piston blank to form the piston with the part-region of the expanded inner peripheral joining face being removed.

10 Claims, 4 Drawing Sheets

(56) References Cited

U.S. PATENT DOCUMENTS

| | | |
|---|---|---|
| 2009/0220820 A1 | 9/2009 | Kolbe et al. |
| 2011/0010997 A1 | 1/2011 | Kislov |
| 2013/0276740 A1 | 10/2013 | Wandrie, III et al. |
| 2014/0305401 A1* | 10/2014 | Ottliczky ............... F02F 3/22 |
| | | 123/193.6 |
| 2015/0135533 A1* | 5/2015 | Scharp ............... B23K 20/12 |
| | | 29/888.044 |

FOREIGN PATENT DOCUMENTS

| | | |
|---|---|---|
| DE | 102011100521 B4 | 1/2015 |
| WO | WO-2013167105 A1 | 11/2013 |

* cited by examiner

METHOD FOR PRODUCING A PISTON

CROSS-REFERENCE TO RELATED APPLICATIONS

This application claims priority to International Patent Application No, PCT/EP2018/053941, filed on Feb. 16, 2018, which claims priority to German Patent Application No. DE 10 2017 203 433.5, filed on Mar. 2, 2017, the contents of both of which are hereby incorporated by reference in their entirety.

TECHNICAL FIELD

The present invention relates to a method for producing a piston for an internal combustion engine having a piston base member and a piston ring element, wherein the piston base member has at least one piston shaft and at least one base region of a combustion bowl, wherein the piston ring element has a piston base, at least one wall region of the combustion bowl, a peripheral top land and at least one portion of a peripheral ring portion which is provided with annular grooves, and wherein the piston base member and the piston ring element form a peripheral closed cooling channel.

BACKGROUND

A generic piston is known, for example, from the Offenlegungsschrift US 2011/0107997 A1. Such pistons may have very flat and large combustion bowls, in particular when they are produced for utility vehicles. The blanks of the piston base member and the piston ring element are, on the one hand, preferably produced by means of a forging method and, on the other hand, preferably joined by means of a friction-welding method, wherein along the weld seams friction weld beads are produced. However, in pistons with flat and large combustion chamber bowls or small structural height relationships (CH/D <55%), it is difficult using a forging method to form in the piston base member a joining face which substantially equates to a pipe end and corresponds to the joining face of the piston ring member.

SUMMARY

The present invention relates to the problem of providing for a method of the generic type an improved or at least a different embodiment, which is in particular more cost-effective.

The solution involves a method having the following steps: (a) providing a blank of the piston base member with an outer peripheral joining face, an inner peripheral joining face which is expanded in the direction of a base region of a combustion bowl and a lower cooling channel portion which extends between the two joining faces, wherein at least one of the joining faces and/or the lower cooling channel portion are not subsequently processed, that is to say, for example, not subsequently processed by means of turning, (b) providing a blank of the piston ring element with an outer annular joining face, an inner annular joining face and an upper cooling channel portion which extends between the two joining faces, wherein at least one of the joining faces and/or the upper cooling channel portion are not subsequently processed, (c) joining the two blanks via the joining faces thereof in order to form a piston blank in such a manner that at least in the base region of the combustion bowl a part-region of the expanded joining face of the blank remains free, (d) subsequently processing and/or completely processing the piston blank to form a piston with the part-region of the expanded joining face being removed.

The notion according to the invention involves the inner joining face of the blank of the piston base member being expanded in the direction of the combustion bowl. This joining face is consequently larger than the corresponding inner joining face of the blank of the piston ring element. It is no longer equivalent as before to a pipe end, but instead is substantially constructed as a ring plate and is consequently substantially less filigree than was previously the case in the prior art. This structurally simple construction of the inner peripheral joining face of the blank of the piston base member enables the blank to be produced by means of a forging method. At the same time, the method according to the invention enables the blanks to be joined by means of a friction-welding method since the friction-welding bead which occurs in this instance in the region of the combustion bowl can expand above the joining face which has remained free and can be simply removed during subsequent processing or complete processing operations. Finally, the method according to the invention enables the combustion bowl to be subsequently formed to be deeper if this is advantageous or desirable. Consequently, using identical blanks for the piston base member, pistons with combustion bowls formed with different depths can be produced. This enables the production of the piston blanks to be rationalized and consequently enables the production costs to be reduced. It is particularly advantageous in this instance that as a result of, for example, completed forged blanks, a subsequent processing of the joining faces and/or cooling channel portions which was previously required after forging for the subsequent friction welding, for example, by means of turning, can be dispensed with, whereby the production costs can be significantly reduced since the forging process is cost-neutral, that is to say, does not involve higher costs compared with the previously used forging process and subsequently no machining processing operation at all is necessary. Another advantage is an elimination of the risk with regard to residual contamination or processing chips so that the process becomes significantly more operationally reliable.

Alternatively, of course, it is also possible with only one of the two blanks, for example, with the blank of the piston base member, not to subsequently process at least one of the joining faces and/or the lower cooling channel, whilst with the blank for the piston ring element at least one of the joining faces and/or the upper cooling channel portion are subsequently processed.

As another alternative, it is also conceivable to subsequently process at least one of the joining faces and/or the lower cooling channel portion in the blank of the piston base member while, in the blank for the piston ring element, at least one of the joining faces and/or the upper cooling channel portion are not subsequently processed. The advantages of the method according to the invention can also be achieved in the two alternatives mentioned.

Subsequently, in the method step (c), the blanks which have been selected in each case are joined by means of the joining faces thereof to form a piston blank in such a manner that at least in the base region of the combustion bowl a part-region of the expanded joining face of the blank remains free, and, in the method step (d), subsequently processing and/or completely processing the piston blank to form a piston with the part-region of the expanded joining face being removed.

In the same manner, of course, it is also possible to produce at least one blank in a casting method, for example, an iron casting method. Also in this instance there is first carried out in method step (a) the provision of the, for example, cast blank of the piston base member with an outer peripheral joining face, an inner peripheral joining face which is expanded in the direction of a base region of a combustion bowl and a lower cooling channel portion which extends between the two joining faces, wherein at least one of the joining faces and/or the lower cooling channel portion are not subsequently processed, that is to say, for example, not subsequently processed by means of turning. In the method step (b) there is provided the cast blank of the piston ring element having an outer annular joining face, an inner annular joining face, and an upper cooling channel portion which extends between the two joining faces, wherein at least one of the joining faces and/or the upper cooling channel portion are not subsequently processed. Generally, extremely different configurations are consequently conceivable, for example, completely non-subsequently-processed blanks, blanks on which only the joining faces or in each case only one joining face, but not the cooling channel portions are subsequently processed, or also blanks in which the associated cooling channel portion and no or one joining face are subsequently processed. Subsequently, the method steps (c) and (d) follow, as before.

Advantageous developments will be appreciated from the dependent claims.

Preferably in step (a) or step (b) the blank and/or the blank is/are produced by means of a forging method. Furthermore, in step (c) the blank is joined to the blank preferably by means of a friction-welding method with at least one friction weld seam being formed. These production methods are particularly commonplace and have been found to be advantageous for some time.

A particularly preferred development makes provision, before the joining by means of a friction-welding method prior to the step (c), for peripheral expansions to be fitted to the inner and outer joining face of the blank and/or the inner and outer joining face of the blank. The joining faces are consequently formed in such a manner that a region of the joining faces during the friction-welding operation can receive excess material. The typical rolled friction weld beads consequently cannot be produced.

The expansions may be formed in any manner, for example, in the form of an oblique face, a chamfer or a recess. The expansions may, for example, be formed with an axial extent of from 1.0 mm to 1.5 mm and/or with a radial extent of at least 0.5 mm.

The blanks are advantageously produced from a quenched and tempered steel or a precipitation-hardened steel. In this case, it is particularly advantageous for the blanks to be quenched and tempered before step (c) and joined in step (c) with a thermal influence zone being formed in the region of the at least one friction weld seam (25, 26, 125, 126) and after step (c) the resulting piston blank to be thermally processed by means of tempering or stress-relief annealing with the thermal influence zone(s) being obtained. In this method, there is in a manner known per se a hardening of the material of the blanks in the closer environment of the friction weld seams. The hardness increases in this region by up to 400 HV (Vickers). This hardened region is referred to as a "thermal influence zone". The thermal influence zone is harder than the quenched and tempered material of the piston blank outside the thermal influence zone. A quenching and tempering after joining by means of friction welding is no longer required. Instead, the piston blank resulting from the friction welding is subjected only to a tempering or stress-relief annealing in order to remove any stresses which may be present. In this instance, the hardness in the thermal influence zone falls slightly, but there is still a hardening with a hardness of up to 200 HV (Vickers). Since the hardness of the quenched and tempered material of the piston blank outside the thermal influence zone as a result of the tempering or stress-relief annealing also falls slightly, the thermal influence zone is substantially maintained. The thermal influence zone in the completed piston is thus a region around the friction weld seam, which has a greater Vickers hardness than the remaining material of the piston.

This thermal influence zone can be used to improve part-regions or part-structures of the piston, which are subjected to more significant wear. To this end, the friction weld seam or the joining faces of the blanks of the piston components which are intended to be connected by means of friction welding is/are positioned in such a manner that the part-regions or part-structures of the piston which is intended to be produced, which part-regions or part-structures are subjected to more significant wear and should therefore be hardened, are located in the thermal influence zone after the friction-welding operation. Consequently, it is no longer necessary to subject these part-regions or part-structures to a separate hardening method, such as nitration or laser beam processing.

In an advantageous development of the invention, there is provision for at least one of the joining faces and/or the lower and/or the upper cooling channel portion to be completely forged when the blank is forged. As a result of the complete forging of at least one of the joining faces and/or at least one of the cooling channel portions, a previously required subsequent processing operation of a piston blank which has not been completely forged can be dispensed with since, for example, joining faces which have already been completely forged, but at least cooling channel portions which have been completely forged, require no further surface processing. Even completely forged joining faces can be produced in such a manner that they can be supplied immediately and without any further processing to the friction-welding process. The production costs can thereby be significantly reduced since the forging process is cost-neutral, that is to say, does not involve higher costs than the previously used forging process, and subsequently no machining processing operation at all is required.

BRIEF DESCRIPTION OF THE DRAWINGS

Embodiments of the present invention are explained in greater detail below with reference to the appended drawings. In the schematic illustrations which are not to scale.

DETAILED DESCRIPTION

Figure 4:
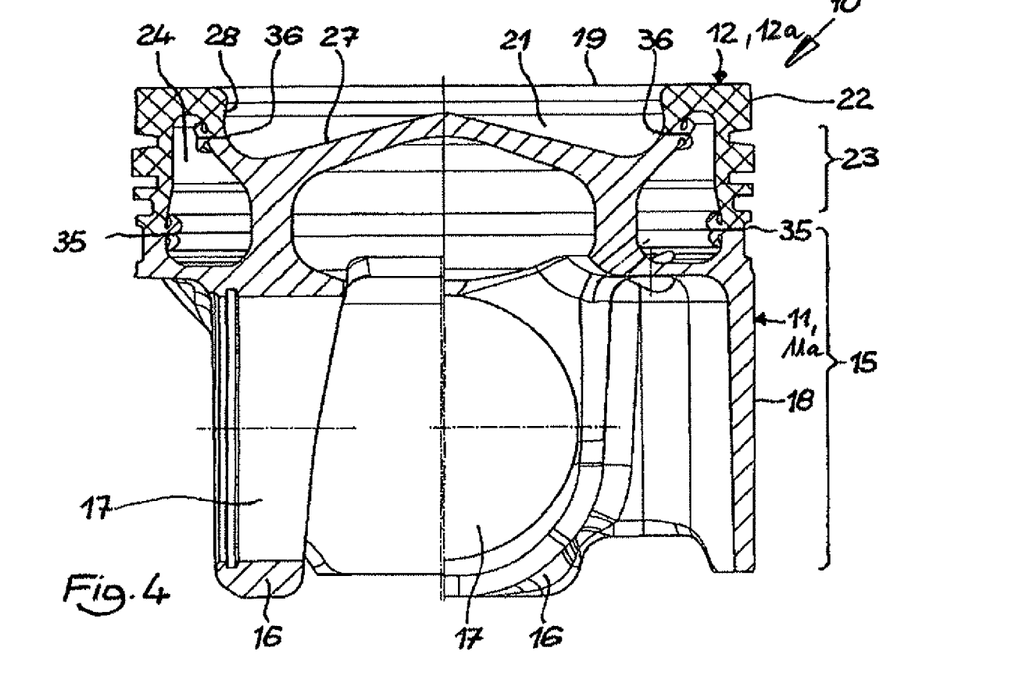
FIG. 4 shows a first embodiment of a completely processed piston from the piston blank according to FIG. 3, wherein the right half of the Figure is rotated with respect to the left half through 90°.
Figure 7:
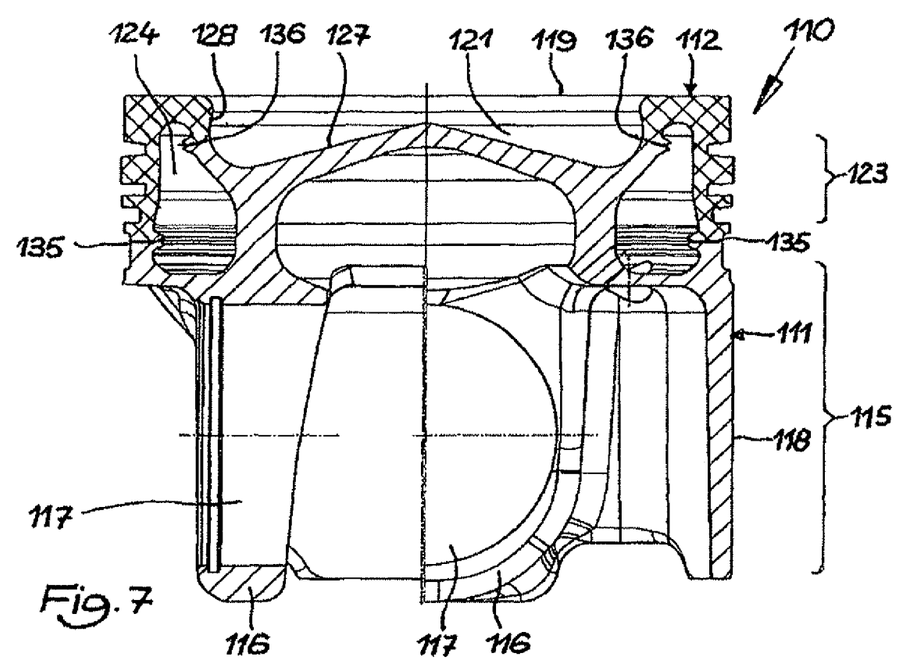
FIG. 7 shows another embodiment of a completely processed piston from the piston blank according to FIG. 6, wherein the right half of the Figure is rotated with respect to the left half through 90°.

FIGS. 4 and 7 show a completed piston 10, 110, which was produced in accordance with the method according to the invention by means of a friction-welding method. The piston 10, 110 comprises a piston base member 11, 111 and a piston ring element 12, 112.

Both components may comprise any metal material which is suitable for friction welding and are connected to each other by means of friction weld seams 35, 36, 135,136.

In the embodiment, the piston base member 11, 111, 211 comprises a steel material, for example, 42CrMo4. The piston base member 11, 111 has a piston shaft 15, 115 which is provided in a manner known per se with piston hubs 16, 116 and hub holes 17, 117 for receiving a piston pin (not illustrated) and running faces 18, 118. The piston ring element 12, 112 is in the embodiment also produced from a steel material, for example 38MnVS6. The piston ring element 12, 112 has a piston base 19, 119 having a combustion bowl 21, 121 and a peripheral top land 22, 122 and a peripheral ring portion 23, 123 for receiving piston rings (not illustrated). The piston base member 11, 111 and the piston ring element 12, 112 together form a peripheral closed cooling channel 24, 124.

The piston 10 according to FIG. 4 is produced by means of the method according to the invention described below.

According to FIG. 2, an at least partially non-subsequently-processed blank 11' of a piston base member 11 and an at least partially non-subsequently-processed blank 12' of a piston ring element 12 are initially provided. The blank 11' of the piston base member 11 has an outer peripheral joining face 29, an inner peripheral joining face 31 which is expanded in the direction of a base region 27 of a combustion bowl 21 and a lower cooling channel portion 24a which extends between the two joining faces 29, 31, wherein at least one of the joining faces 29, 31 and/or the lower cooling channel portion 24a are not subsequently processed, that is to say, not processed, for example, after the forging by means, for example, of turning. Subsequently processed in this instance means subsequent working after the production of the blank 11' and pre-processing before the friction welding. In the same manner, there is provided a blank 12' of the piston ring element 12 which has an outer annular joining face 32, an inner annular joining face 33 and an upper cooling channel portion 24b which extends between both joining faces 32, 33, wherein at least one of the joining faces 32, 33 and/or the upper cooling channel portion 24b are not subsequently processed, that is to say, not processed, for example, after the forging, for example, by means of turning. The blank 11' may naturally, for example, be subsequently processed in the base region 27 of the combustion bowl 21, for example, by means of turning. The non-subsequent processing consequently relates exclusively to at least one joining face 29, 129, 229, 31, 131, 231, 32, 33; 132, 133; 232, 233 and/or at least one cooling channel portion 24a, 124a, 224a, 24b, 124b, 224b (cf. also FIGS. 3-8).

Alternatively but equivalently, it is in this instance also conceivable in the method according to the invention to use a blank (11',111', 211) of the piston base member (11, 111) in which at least one of the joining faces (29, 129, 229, 31, 131, 231) and/or the lower cooling channel portion (24a, 124a, 224a) are not subsequently processed and a blank (12a) of the piston ring element (12, 112), in which at least one of the joining faces (32, 33; 132, 133; 232, 233) and/or the upper cooling channel portion (24b, 124b, 224b) are subsequently processed. Also in this instance, there is subsequently carried out in step (c) a joining of the blank (11', 111', 211) with the blank (12a) by means of the joining faces thereof (29, 129, 229; 31, 131, 231; 32, 132, 232; 33, 133, 232) to form a piston blank (10', 110') in such a manner that at least in the base region (27, 127) of the combustion bowl (24, 124) a part-region (34, 134, 234) of the expanded joining face (31, 131, 231) of the blank remains free (11',111', 211), and in the method step (d) a subsequent processing and/or complete processing of the piston blank (10', 110') to form a piston (10, 110) with the part-region (34, 134, 234) of the expanded joining face (31, 131, 231) being removed.

Again alternatively but again also equivalently, it is conceivable in the method according to the invention to use a blank (11a) of the piston base member (11, 111) in which at least one of the joining faces (29, 129, 229, 31, 131, 231) and/or the lower cooling channel portion (24a, 124a, 224a) have been subsequently processed, and a blank (12', 112', 212) of the piston ring element (12, 112), in which at least one of the joining faces (32, 33; 132, 133; 232, 233) and/or the upper cooling channel portion (24b, 124b, 224b) are not subsequently processed.

Also in this instance there is carried out in method step (c) joining of the blank (11a) to the blank (12', 112', 212) by means of the joining faces (29, 129, 229; 31, 131, 231; 32, 132, 232; 33, 133, 232) thereof to form a piston blank (10', 110') in such a manner that at least in the base region (27, 127) of the combustion bowl (24, 124) a part-region (34, 134, 234) of the expanded joining face (31, 131, 231) of the blank (11a) remains free, and in the method step (d) a subsequent processing and/or complete processing of the piston blank (10', 110') to form a piston (10,110) with the part-region (34, 134, 234) of the expanded joining face (31, 131, 231) being removed.

The blanks 11', 11a, 111', 12', 12a, 212' are in the embodiment produced by means of a forging method. Subsequently, in the embodiment, the base region 27 of the combustion bowl 21 can be incorporated, for example, screwed in the blank 11'. Furthermore, it is naturally also possible for a peripheral lower cooling channel portion 24a of the cooling channel 24 to be pre-processed. This results in the outer peripheral joining face 29 and the inner peripheral joining face 31. According to the invention, the inner joining face 31 is expanded in the direction of the base region 27 as can be seen particularly clearly from a comparison with the piston blank illustrated in FIG. 1 according to the prior art.

In the embodiment, the wall region 28 of the combustion bowl 21 is incorporated, for example, screwed in the blank 12', 12a. Furthermore, a peripheral upper cooling channel portion 24b of the cooling channel 24 is incorporated. This results in the outer peripheral joining face 32 and the inner peripheral joining face 33. The outer joining face 29 of the blank 11' corresponds to the outer joining face 32 of the blank 12'. Accordingly, the inner, expanded joining face 31 of the blank 11', 11a corresponds to the inner joining face 33 of the blank 12'. This means that the two blanks 11', 11a, 12', 12a can be connected to each other along the joining faces 29, 31 and 32, 33 thereof to form a piston blank 10'.

Figure 1:
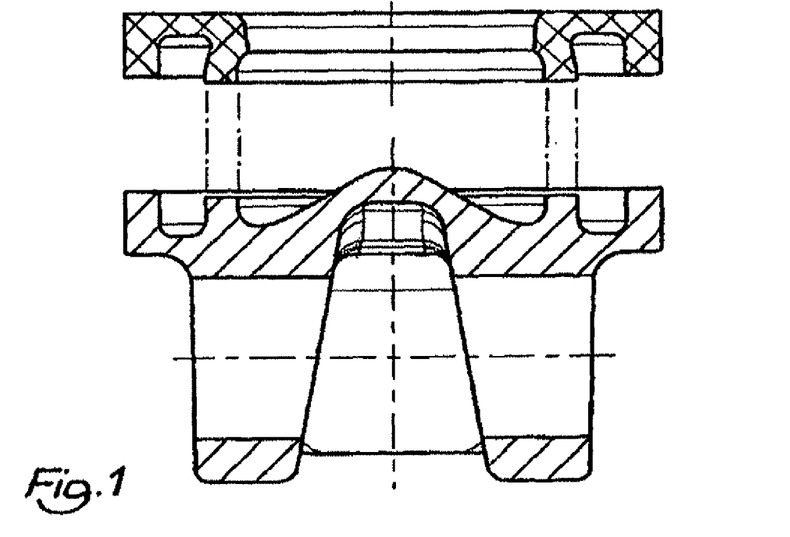
FIG. 1 shows an embodiment of blanks for producing a generic piston according to the prior art.
Figure 2:
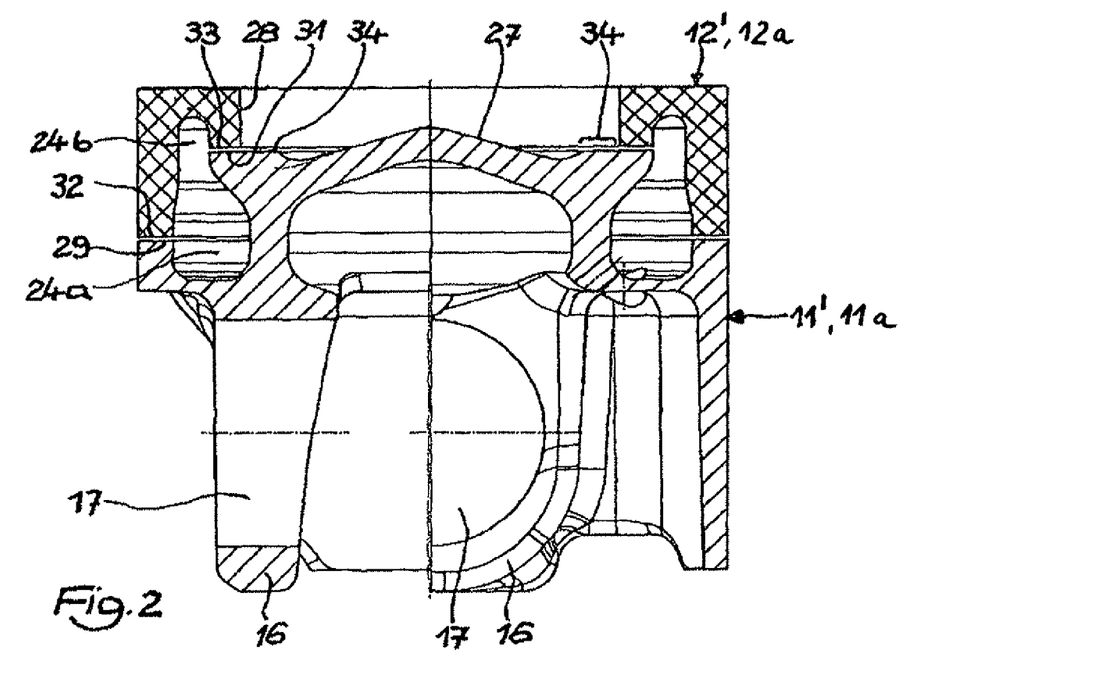
FIG. 2 shows a first embodiment of blanks, from which a piston is produced in accordance with the method according to the invention, wherein the right half of the Figure is rotated with respect to the left half through 90°.

As can be seen clearly in FIG. 2, in particular in comparison with the prior art according to FIG. 1, the inner, expanded joining face 31 of the blank 11', 11a and the inner joining face 33 of the blank 12', 12a correspond to each other according to the invention in such a manner that a part-region 34 of the joining face 31 facing in the direction of the base region 27 of the combustion bowl 21 remains free.

In order to connect the two blanks 11', 12', or 11', 12a, or 11a, 12', they are clamped in alignment in a manner known per se and joined together by means of a friction-welding method. An embodiment of a friction-welding method makes provision for one of the two blanks 11', 11a, 12', 12a to be caused to rotate until a speed of 1,500 rpm to 2,500 rpm is reached. The blanks 11', 12', or 11', 12a, or 11a, 12' are brought into contact with each other via the joining faces 29, 31 and 32, 33 thereof and pressed together at a pressing pressure with respect to the joining faces 29, 31 and 32, 33 of 10 N/mm$^2$ to 30 N/mm$^2$. The rotational movement and the pressing pressure produce a friction which heats the joining faces 29, 31 or 32, 33. The speed and the pressing pressure are, depending on the materials used, selected in such a manner that the joining faces, 29, 31 or 32, 33 are heated to a temperature close to the melting point of the material or the materials. When this is achieved (depending on the material or materials, after 1 to 3 seconds), the rotation is ended with the pressing pressure being maintained, that is to say, the clamping device is braked and stopped as quickly as possible (where possible, within less than 1 second). During this operation, the pressing pressure is maintained. After the stoppage, the pressing pressure is increased to a joining pressure, with respect to the joining faces 29, 31 or 32, 33 of 100 N/mm$^2$ to 140 N/mm$^2$ and the blanks 11', 12', or 11', 12a, or 11a, 12' are pressed together for approximately 5 seconds under this joining pressure. The described friction-welding method may of course also be used for the other embodiments of the blanks illustrated in the Figures. Similarly, all the remaining advantages or properties are not intended to be considered to be limiting only to the respective Figure, but can instead also be transferred to other Figures and the embodiments shown therein.

Figure 3:
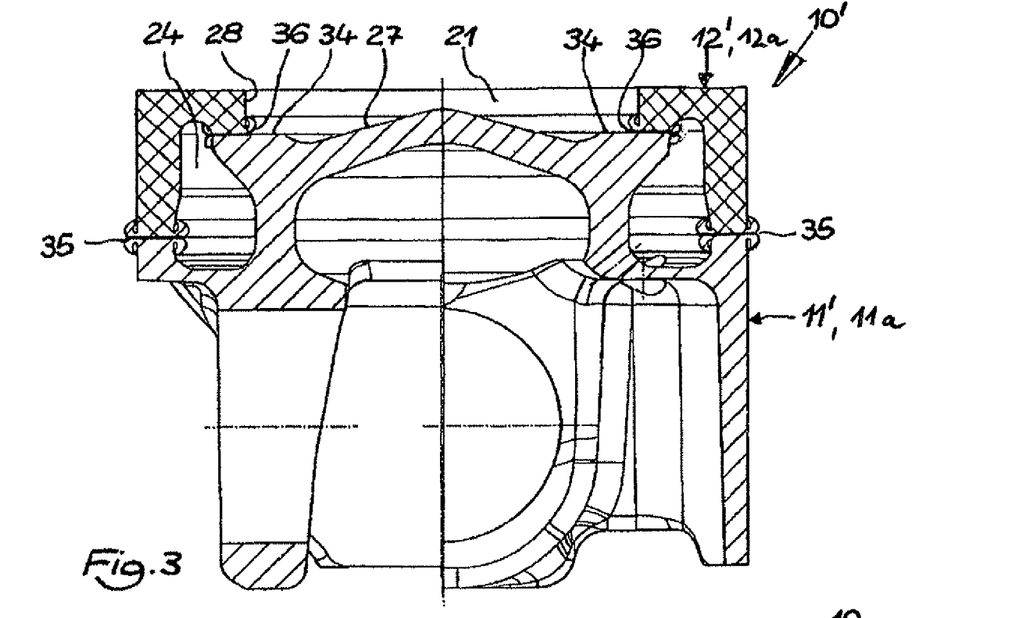
FIG. 3 shows a first embodiment of a piston blank which is joined by means of a friction-welding method from the blanks according to FIG. 2, wherein the right half of the Figure is rotated with respect to the left half through 90°.

FIG. 3 shows the piston blank 10' produced in this manner. The piston blank 10' has as a result of the above-described friction-welding operation friction weld seams 35, 36.

The piston blank 10' is in a manner known per se, depending on the formation of the blanks 11', 12', 11a, 12a subsequently processed or completely processed. For example, the outer shape, surfaces, combustion bowl, ring portion, hub holes, etcetera, can be completely processed.

According to the invention, the free part-region 34 of the joining face 31 is removed, preferably by means of unscrewing. During this method step, the base region 27 and the wall region 28 of the combustion bowl 21 are completely processed. In this instance, the depth of the combustion bowl 21 when the part-region 34 of the joining face 31 is removed can be freely selected. Consequently, with structurally identical blanks 11', 11a for the piston base member 11 pistons 10 with combustion bowls 21 of a different depth can be produced. Consequently, the above-described completed piston 10 according to FIG. 4 is obtained.

The blanks 11', 12', 11a, 12a can be produced from a quenched and tempered steel or a precipitation-hardened steel and be quenched and tempered before the joining. When joining by means of friction welding, a thermal influence zone is formed in each case right around the friction weld seams 35, 36 produced. The thermal influence zones extend above and below the friction weld seams 35, 36 over approximately 1 to 3 mm in each case. In the region of the thermal influence zones, the hardness of the material is increased by approximately 400 HV (Vickers) with respect to the quenched and tempered material of the blanks 11', 11a, 12', 12a outside the thermal influence zones. The resulting piston blank 10' is then after the friction welding subjected to a thermal processing operation, that is to say, a tempering or a stress-relief annealing. This thermal processing leads to the hardness of the material both in the thermal influence zones and outside the thermal influence zones being reduced by approximately 200 HV (Vickers). The difference in hardness between the harder thermal influence zones and the remaining material of the blanks 11', 11a, 12', 12a is consequently permanently maintained.

Figure 5:
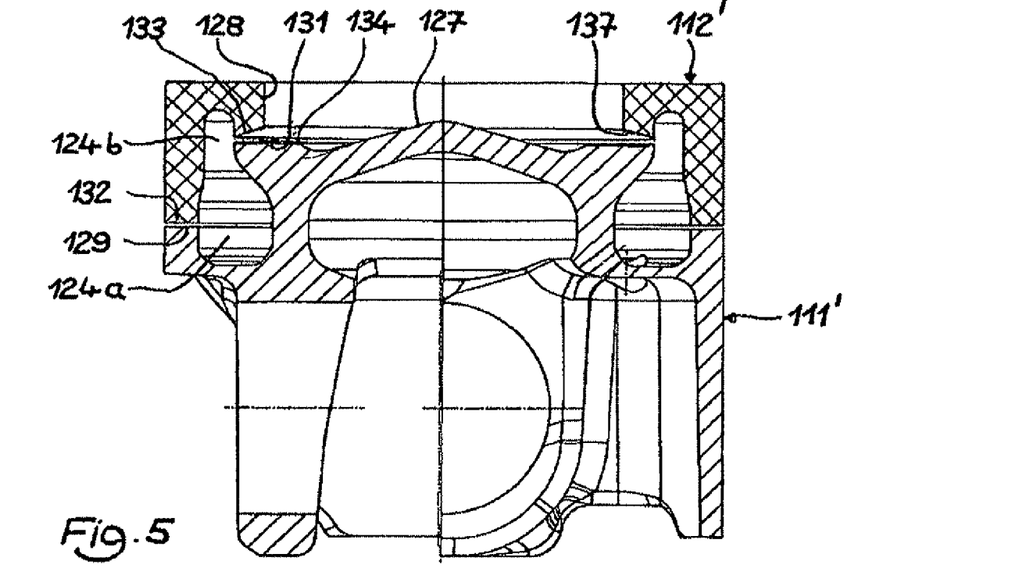
FIG. 5 shows another embodiment of blanks, from which a piston is produced in accordance with the method according to the invention, wherein the right half of the Figure is rotated with respect to the left half through 90°.

FIG. 5 shows another embodiment of a blank 111' of a piston base member 111 and a blank 112' of a piston ring element 112 for a piston 110 according to the invention. The blanks 111', 112' are produced in the embodiment by means of a forging method. Subsequently, the blanks 111', 112' were processed. In this instance, in the embodiment, the base region 127 of the combustion bowl 121 was incorporated, for example, screwed into the blank 111'. The blank 111' of the piston base member 111 has an outer peripheral joining face 129, an inner peripheral joining face 131 which is expanded in the direction of a base region 127 of the combustion bowl 124 and a lower cooling channel portion 124a which extends between both joining faces 129, 131, wherein at least one of the joining faces 129, 131 and/or the lower cooling channel portion 124a is not subsequently processed, that is to say, not processed, for example, after the forging operation, for example, by means of turning. In the same manner, there is provided the blank 112' of the piston ring element 112, which has an outer annular joining face 132, an inner annular joining face 133 and an upper cooling channel portion 124b which extends between two joining faces 132, 133, wherein at least one of the joining faces 132, 133 and/or the upper cooling channel portion 124b are not subsequently processed, that is to say, for example, after the forging operation not processed, for example, by means of turning.

In the embodiment, the wall region 128 of the combustion bowl 121 is incorporated, for example, screwed into the blank 112'. Furthermore, the peripheral upper cooling channel portion 124b of the cooling channel 124 is incorporated. This results in the above-described outer peripheral joining face 132 and the inner peripheral joining face 133. The outer joining face 129 of the blank 111' corresponds to the outer joining face 132 of the blank 112'. Accordingly, the inner, expanded joining face 131 of the blank 111' corresponds to the inner joining face 133 of the blank 112'. This means that the two blanks 111', 112' can be connected to each other along the joining faces 129, 131 or 132, 133 thereof in order to form a piston blank 110'.

As can be seen clearly in FIG. 5, in particular in comparison with the prior art according to FIG. 1, the inner, expanded joining face 131 of the blank 111' and the inner joining face 133 of the blank 112' correspond to each other according to the invention in such a manner that a part-region 134 of the joining face 131 facing the base region 127 of the combustion bowl 121 remains free.

In this embodiment, on the inner joining faces 133 of the blank 112' of the piston ring element 112, a peripheral expansion 137 in the form of a chamfer is formed. The expansion 137 opens in the direction of the base region 127 of the combustion bowl 121. The maximum axial extent of the expansion 137 is in the embodiment in each case approximately 1 mm. If the joining faces 129, 131 or 132, 133 of the blanks 111', 112' come into contact with each other at the beginning of the above-described friction-welding operation, the expansions 137 in the embodiment form a free space in the form of a right-angled triangle with a maximum axial extent of approximately 1 mm, in which the molten material is distributed. In this instance, the excess material is absorbed in the above-described joining operation. Of course, expansions with a different geometry can also be combined with each other.

Figure 6:
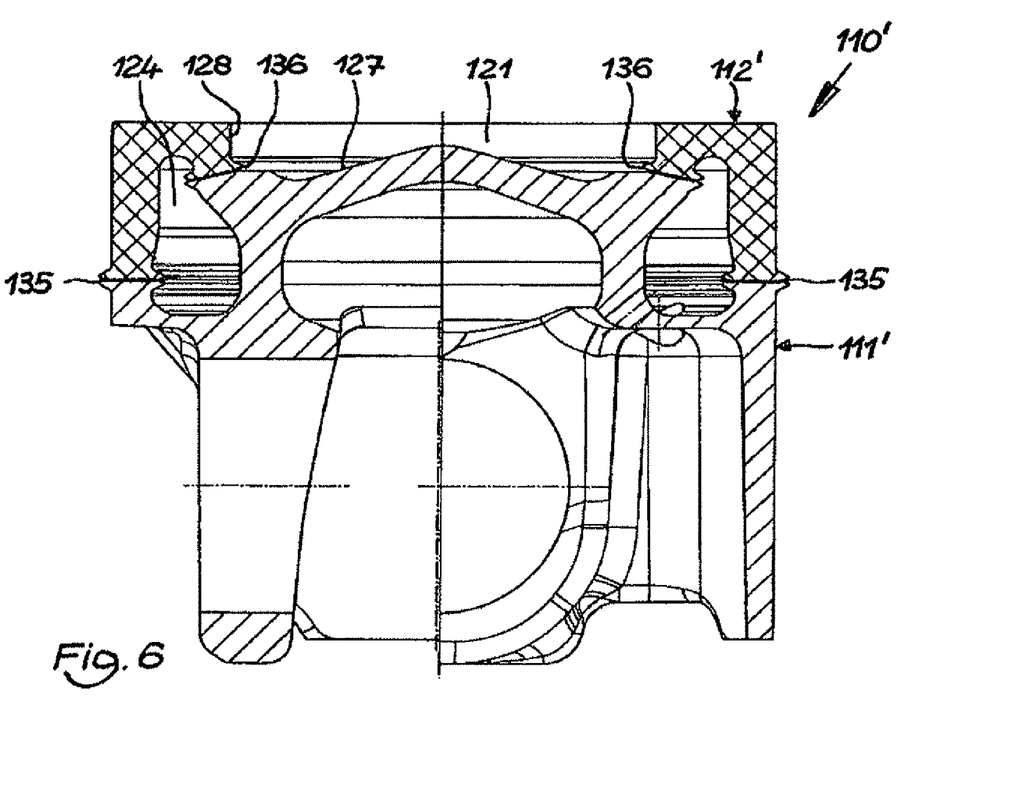
FIG. 6 shows another embodiment of a piston blank which has been joined by means of a friction-welding method from the blanks according to FIG. 5, wherein the right half of the Figure is rotated with respect to the left half through 90°.

The blanks 111, 112 are joined by means of the above-described friction-welding method. FIG. 6 shows the piston blank 110' which has been produced in this manner. The piston blank 110' has as a result of the above-described friction-welding operation friction weld seams 135, 136. It can further be seen in FIG. 6 that along the friction weld seams 135, 136 no friction weld beads, as illustrated in FIG. 3, have been produced. The excess molten material which has been released during the above-described friction-welding operation was absorbed by the free space formed from the expansion 137 during the friction-welding operation.

The piston blank 110' is subsequently processed or completely processed in a manner known per se, depending on the construction of the blanks 111', 112'. For example, the outer shape, surfaces, combustion bowl, ring portion, hub holes, etcetera, can be completely processed. According to the invention, the free part-region 134 of the joining face 131 is removed, preferably by means of unscrewing. During this method step, the base region 127 and the wall region 128 of the combustion bowl 121 are completely processed. In this instance, the depth of the combustion bowl 121 when the part-region 134 of the joining face 131 is removed can be freely selected. Consequently, with structurally identical blanks 111' for the piston base member 111, pistons 110 with combustion bowls 121 of different depths can be produced. Consequently, the above-described completed piston 110 according to FIG. 7 is obtained.

Figure 8:
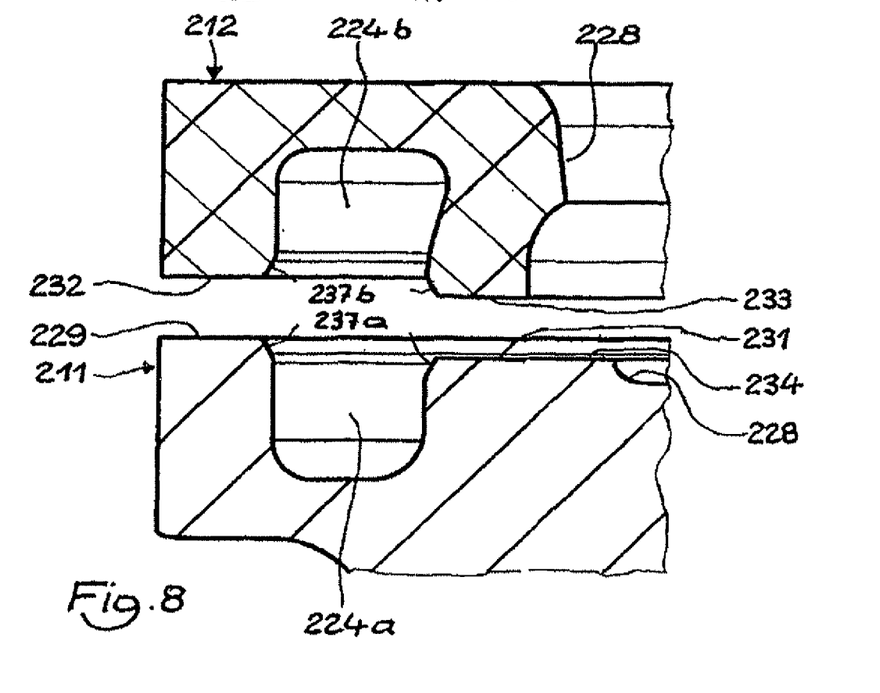
FIG. 8 is an enlarged partial illustration of another embodiment of blanks, from which a piston is produced according to the method according to the invention.

FIG. 8 is an enlarged partial illustration of another embodiment of blanks 211, 212, from which according to the method according to the invention a piston is produced. In this embodiment, on both joining faces 229, 231 of the blank 211 and on both joining faces 232, 233 of the blank 212, a peripheral expansion 237a, 237b in the form of a chamfer is formed. The expansions 237a extend in the direction of the cooling channel portion 224a of the blank 211. Accordingly, the expansions 237b extend in the direction of the cooling channel portion 224b of the blank 212. The maximum axial extent of the expansions 237a, 237b is in the embodiment in each case approximately 1.0 mm, whilst the radial extent of the expansions 237a, 237b is in each case approximately 0.5 mm. When the joining faces 229, 231 or 232, 233 of the blanks 211, 212 come into contact with each other at the beginning of the above-described friction-welding operation, the expansions 237a, 237b form in the embodiment two mutually opposed joints with a maximum axial extent of approximately 2 mm. which can absorb excess material. Of course, expansions with a different geometry may also be combined with each other.

The invention claimed is:

1. A method for producing a piston for an internal combustion engine having a piston base member and a piston ring element, wherein the piston base member has at least one piston shaft and at least one base region of a combustion bowl, wherein the piston ring element has a piston base, at least one wall region of the combustion bowl, a peripheral top land and at least one portion of a peripheral ring portion which is provided with annular grooves, and wherein the piston base member and the piston ring element form a peripheral closed cooling channel, the method comprising:
   providing a blank of the piston base member with an outer peripheral joining face, an inner peripheral joining face which is expanded in a direction of the base region of the combustion bowl, and a lower cooling channel portion which extends between the outer and inner peripheral joining faces;
   providing a blank of the piston ring element with an outer annular joining face, an inner annular joining face, and an upper cooling channel portion which extends between the outer and inner annular joining faces;
   one of:
      processing at least one of (i) at least one of the outer and inner peripheral joining faces and (ii) the lower cooling channel portion to obtain a processed blank of the piston base member, but not processing the outer and inner annular joining faces or upper cooling channel portion of the blank of the piston ring element; or
      processing at least one of (i) at least one of the outer and inner annular joining faces and (ii) the upper cooling channel portion to obtain a processed blank of the piston ring element, but not processing the outer and inner peripheral joining faces or lower cooling channel portion of the blank of the piston base member;
   joining the processed blank of the piston base member to the unprocessed blank of the piston ring element or the processed blank of the piston ring element to the unprocessed blank of the piston base member via the outer and inner peripheral joining faces and the outer and inner annular joining faces to form a piston blank in such a manner that, at least in the base region of the combustion bowl, and a part-region of the expanded inner peripheral joining face of the processed or unprocessed blank of the piston base member remains free; and
   subsequently at least partially processing the piston blank to form the piston with the part-region of the expanded inner peripheral joining face being removed.

2. The method as claimed in claim 1, wherein one of:
   at least one of the blank of the piston base member and the blank of the piston ring element is produced via forging; or
   at least one of the blank of the piston base member and the blank of the piston ring element is produced via casting.

3. The method as claimed in claim 1, wherein joining the blank of the piston base member to the blank of the piston ring element is via friction-welding with at least one friction weld seam being formed.

4. The method as claimed in claim 1, wherein, prior to joining the blanks, at least one peripheral expansion is fitted to at least one of the inner peripheral joining face, the outer peripheral joining face, the inner annular joining face, and the outer annular joining face.

5. The method as claimed in claim 4, wherein the at least one peripheral expansion is formed in the form of one of an oblique face, a chamfer, or a recess.

6. The method as claimed in claim 4, wherein each peripheral expansion is formed with at least one of (i) an axial extent of from 1.0 mm to 1.5 mm, and (ii) a radial extent of at least 0.5 mm.

7. The method as claimed in claim 1, wherein the blanks are produced from one of (i) a quenched and tempered steel, or (ii) a precipitation-hardened steel.

8. The method as claimed in claim 7, wherein:
prior to joining the blanks, the blanks are quenched and tempered;
when joining the blanks, the blanks are joined with a thermal influence zone being formed in a region of at least one friction weld seam; and
after joining the piston blanks, the piston blank is thermally processed via tempering or stress-relief annealing with the thermal influence zone.

9. The method as claimed in claim 2, wherein at least one of (i) at least one of the inner and outer peripheral joining faces and (ii) the lower cooling channel portion is completely forged when the blank of the piston base member is forged.

10. The method as claimed in claim 2, wherein at least one of (i) at least one of the inner and outer annular joining faces and (ii) the upper cooling channel portion is completely forged when the blank of the piston ring element is forged.

* * * * *